United States Patent [19]
Nesch

[11] Patent Number: 6,139,305
[45] Date of Patent: Oct. 31, 2000

[54] APPARATUS FOR PRODUCTION OF INJECTION MOLDED ARTICLES FROM AT LEAST TWO PLASTIC MELTS

[75] Inventor: Wolfgang Nesch, Lahr-Sulz, Germany

[73] Assignee: Ferromatik Milacron Maschinenbau GmbH, Germany

[21] Appl. No.: 09/128,231

[22] Filed: Aug. 3, 1998

[30] Foreign Application Priority Data

Aug. 4, 1997 [DE] Germany .......................... 197 33 667

[51] Int. Cl.⁷ ............................................. B29C 45/16
[52] U.S. Cl. ........................ 425/130; 264/255; 425/576
[58] Field of Search .................................. 425/574, 575, 425/576, 130; 264/255

[56] References Cited

U.S. PATENT DOCUMENTS

| | | | |
|---|---|---|---|
| 4,726,558 | 2/1988 | Ozone et al. | 248/68.1 |
| 4,734,023 | 3/1988 | Nesch et al. | 425/130 |
| 5,063,648 | 11/1991 | Yonezawa et al. | 425/190 |
| 5,817,345 | 10/1998 | Koch et al. | 425/130 |

FOREIGN PATENT DOCUMENTS

| | | |
|---|---|---|
| 2372019 | 6/1978 | France . |
| 2426883 | 6/1974 | Germany . |
| 3620175 | 5/1989 | Germany . |
| 2300142 | 10/1996 | United Kingdom . |

OTHER PUBLICATIONS

Merriam–Webster's Collegiate Dictionary, p. 88, 1996.
Patent Abstracts of Japan, vol. 11, No. 250 (M0616), Aug. 14, 1987 and JP 62 060618 A (Japan Steel Works Ltd. Mar. 17, 1987.
Patent Abstracts of Japan, vol. 5, No. 101 (M–76), Jun. 30, 1981 & JP 56 044635 A (Nippon Seikosho KK), Apr. 23, 1981.
"Multifunctional Molding" Japan Plastics Age, Bd. 25, Nr. 215, May 1987–Jun. 1987, Seiten 21–23, XP002084459 Tokyo, Japan.

*Primary Examiner*—Tim Heitbrink
*Attorney, Agent, or Firm*—Stephen H. Friskney

[57] ABSTRACT

An injection molding apparatus capable of producing injection molded articles from at least two plastic melts, includes an additional mold mounting device between a fixed mold mounting plate and a movable mold mounting plate that is traversed along four essentially horizontal tie rods. The additional mold mounting device is also pivotable around a rotational axis aligned perpendicular to the longitudinal axis of the tie rods, and carries additional mold halves that cooperate with the mold halves mounted on the mold mounting plates on at least two side surfaces that are aligned with a spacing parallel to each other and relative to the rotational axis. The additional mold mounting device comprises upper and lower support blocks that are arranged at a spacing relative to each other in an essentially vertically aligned plane, with each support block being guided on at least of the two tie rods. A friction or pivot bearing is provided for vertically aligned pivots of a prismatic mold core support. The additional mold mounting device further includes at least two drive devices to change the relative spacing between the mold mounting plates and the support blocks.

19 Claims, 2 Drawing Sheets

APPARATUS FOR PRODUCTION OF INJECTION MOLDED ARTICLES FROM AT LEAST TWO PLASTIC MELTS

BACKGROUND OF THE INVENTION

1. Field of the Invention

The present invention relates generally to injection molding machines and, more particularly, to apparatus for production of injection molded articles from at least two supplies of plastic melt.

2. Description of the Related Art

Injection molding machines capable of producing two component molded articles are generally known from DE 36 20 175 C2, for example. In addition to ensuring a specified speed profile for closing and opening of the injection mold, the underlying task of the injection molding machine described in this patent is to produce injection molded articles from at least two plastic melts within a single machine cycle. Such molded articles might require, for example, melts having different material properties, different colors, or that produce transparent and opaque regions in the injection molded articles after solidification.

The injection molding machine described in DE 36 20 175 C2 includes the usual arrangement of a fixed mold mounting plate (attached to a machine frame) to accept a mold half, a counter-pressure plate also fixed on the machine frame at a spaced distance from the fixed mold mounting plate, these two stationary plates being connected by several (usually four) linear tie rods. The machine further includes a movable mold mounting plate that accepts a second mold half and is traversed on the tie rods by means of a clamping unit arranged between the counter-pressure plate and the moveable mold mounting plate. The clamping unit is of a known type, for example, a hydraulically operated piston-cylinder arrangement or a toggle mechanism that is actuated hydraulically.

This prior art patent provides a prismatic mold core support arranged between the two mold mounting plates and the mold halves mounted thereon. The mold core support is pivotable around an axis of rotation secured by two support rods that are aligned and movable parallel to the tie rods, so that the axis of rotation is perpendicular to the two support rods. The side surfaces of the mold core support are aligned parallel to its axis of rotation and serve to mount additional mold halves that can also be designed simply as cores. The positioning of the mold core support is adjustable by means of the pivoting movement so that always two of the side surfaces equipped with mold halves are exactly opposite a mating mold half on one of the mold mounting plates to form complete injection mold cavities with the mold halves opposite them on the mold mounting plates when the clamping unit is operated in the closing direction.

Supply of plastic melt to the injection molds described above, occurs by means of conventional plasticizing and injection units. More specifically, the injection mold cavity formed between the fixed mold mounting plate and core support is ordinarily supplied with plastic melt by a plasticizing and injection unit that is situated generally parallel to the tie rods on the side of the fixed mold mounting plate opposite the injection mold, and is positioned through an opening in the mold mounting plate to connect to a sprue channel running into the mold. The injection mold cavity formed between the moveable mold mounting plate and core support is supplied with plastic melt from a second plasticizing and injection unit by a sprue channel running through both the moveable mold mounting plate and the mold half mounted thereon. The sprue opening is situated in an outside surface of the moveable mold mounting plate aligned parallel to the longitudinal direction of the tie rods, so that the second plasticizing and injection unit is arranged essentially perpendicular to these rods and is only advanced to the sprue opening in the moveable mold mounting plate after complete closure of the injection mold.

If the prismatic core support has a cross-sectional surface perpendicular to its axis of rotation in the form of a regular, even-numbered polygon with the rotational axis being aligned essentially vertically, then in the closed state of the injection mold formed by the mold halves on the mold mounting plates and the core support, additional, adjustably arranged, mold mounting plates with corresponding mold halves and plasticizing and injection units can be advanced to the other side surfaces of the core support to mate with additional mold halves, in order to supply either additional plastic melts to produce the desired injection molded article or to produce more than one of the desired injection molded articles within a complete machine cycle. The minimal machine cycle then consists of the fact that a partial core is injected into one injection mold (preferably into the one formed by the mold halves on the fixed mold mounting plate) with a first plasticizing and injection unit, while at the same time a partial core produced in a preceding cycle step is completed to the desired injection molded article in a second injection mold (preferably in the one formed by the mold half abutting the moveable mold mounting plate) by a second plasticizing and injection unit with its plastic melt. The completed injection molded article is then ejected by an ejector at the desired location in or on the moveable mold mounting plate or in the core support, during the period from opening of the injection mold through pivoting the core support around its axis of rotation (ordinarily by an angle of 180°) to position the mold halves held by the core support in front of the other mold mounting plate.

The two support rods for the mold core support are arranged parallel to the tie rods that connect the fixed mold mounting plate and the counter-pressure plate. The support rods are moveable, they secure the rotational axis of the core support, they are carried and guided by two openings in the moveable mold mounting plate, and they are interconnected by a cross-arm in the space between the moveable mold mounting plate and the counter-pressure plate. The cross-arm is connected to an actuator abutting the moveable mold mounting plate, for example, a hydraulically operated piston-cylinder arrangement or a suitably controlled stepping motor. The support rods ordinarily secure the rotational axis of the core support by means of bearings arranged on their ends facing the fixed mold mounting plate, in which the axis of rotation itself can be supported both in the essentially horizontal and in the essentially vertical position or also in an intermediate position as long as this support occurs perpendicular to the axis of the support rods.

The prior art design described above permits both a distinct pivoting movement of the core support (although the cited patent contains no details concerning the required mechanism) and a significant change in relative spacing between the core support and the moveable (and thus necessarily the fixed) mold mounting plate—assuming the spacing between the rotational axis of the core support and the mold mounting plates has a sufficient length. Based on the usual dimensioning of the support rods of the type shown in the prior art, only the use of a light and therefore small core support and correspondingly small mold halves is feasible; this limits the design to the production of injection molded articles of small dimension. However, a number of large dimensioned, large surface area parts, such as, bumpers, dashboards, sun roofs, etc. for vehicles are often injection molded from plastic melts, but such parts can only be produced from two or more plastic melts in a costly multistage injection molding processes, given the design limitations of the prior art machines discussed above.

The injection molds or mold halves and the associated core supports necessary to produce large, two or more melt, injection molded articles using the described prior art machine would require a very costly design of the support rods to carry the core supports, including the associated guides in the moveable mold mounting plate and a larger actuator, as well as a much more rigid designs for the moveable mold mounting plate, the machine's clamping unit, and the entire machine frame. These components would have to be made stronger (a) to accommodate the large-volume and/or large-surface mold halves, (b) to prevent the rods carrying the core supports from bending during the process of opening the injection molds, and/or (c) to prevent distortion of the bearings in the moveable mold mounting plate so that tight closure of the injection molds can be maintained.

Although not mentioned in the above-referenced patent, replacement of the core support is highly desirable to allow for flexible use of an injection molding machine of the present type, but the associated problems are significant. The sudden unloading of the support rods when removing the core support, or the sudden loading during installation of a core support, can lead to more or less dampened oscillations of the rods, resulting in very rapid material fatigue, hairline cracks, stress cracking and similar material damage. This damage creates a risk of sudden fracture of the rods, which could result in a significant hazard for the operating personnel. However, if the disadvantages of the prior art could be overcome, the applicability of the injection molding machine disclosed in DE 36 20 175 C2 would then, in principle, be attractive for production of large-volume and/or large-surface injection molded articles from at least two plastic melts.

SUMMARY OF THE INVENTION

An object of the present invention is to improve the injection molding machine of the described prior art in such a way that large-volume and/or large-surface injection molded articles formed from at least two plastic melts can be produced in one machine cycle. Another object of the invention is to provide a machine construction in which it is possible at any time to replace simply and without risk, not only individual mold halves, but also a moveable and pivotable mold core support positioned between the conventional mold mounting plates and their associated mold halves. The present invention accomplishes these objectives by means of the features set forth below and in the appended claims.

In the injection molding apparatus of the present invention, it has proven to be particularly advantageous to provide an additional mold mounting device comprising two rigid support blocks spaced from each other in an essentially vertically aligned plane and each guided on at least two tie rods that are arranged in an essential horizontally aligned plane. Each support block is provided with a bearing to receive the essentially vertically aligned rotational axis pivots of a prismatic mold core support on which the mating mold halves are mounted. The support blocks are connected to at least two drive devices, which are actuated to change the corresponding relative spacing between the mold mounting plates and the support blocks in the longitudinal direction of the tie rod. This arrangement provides stable support for even a relatively large and/or heavy mold core support, regardless of the relative spacing between the mold mounting plates and the mold core support. The stability of the system can be further increased advantageously where the lower support block is directly adjacent to the machine frame so that it can be supported by means of rollers and/or rails in contact with the machine bed formed on the machine frame positioned beneath the tie rods.

Separation of this additional mold mounting device into two essentially horizontally arranged stable support blocks, each of which is provided with at least one of its own drive devices, and a mold core support provided with an essentially vertically aligned axis of rotation, also proves to be very advantageous with respect to changing the mold core support. With this construction, only the weight of the actual mold core support needs to be moved and an exact adjustment of a newly introduced mold core support is accomplished by means of the separate drive devices for the support blocks (even though these drive devices are operated synchronously during machine operation).

Further advantages are achieved by an embodiment of the device according to the invention in which the mold core support has a cross-sectional surface (perpendicular to its axis of rotation) in the form of a regular, even-numbered polygon, in which each side surface is arranged parallel to the axis of rotation and can be used as a mounting surface for at least one additional mold half. High flexibility of the existing injection molding machine is achieved by this construction, especially when additional mold halves are mounted on the additional side surfaces of the mold core support not directly opposite the mold mounting plates to form additional complete injection molds in the closed state of the mold mounting plates with additional mold halves, supported by additional mold mounting plates, each equipped with at least one corresponding plasticizing and injection unit and moveable in the specified direction, so that in one machine cycle either one injection molded article can be produced from more than two plastic melts or more than one injection molded article can be produced from at least two plastic melts simultaneously.

In another embodiment of the present invention, it is advantageous for the mold core support to have a cross-sectional surface (perpendicular to their axis of rotation) in the form of an irregular, even-numbered polygon, in which only specific pairs of side surfaces are arranged parallel to each other and can be used as support surfaces for at least one additional mold half. For example, the mold core support can have a cross-sectional surface (perpendicular to its axis of rotation) in the form of an elongated rectangle, in which only the side surfaces arranged parallel to the axis of rotation and forming the long edges of the rectangle are used as contact surfaces for at least one additional mold half. This configuration of the mold core support (at least where the number of parallel side surfaces that can be equipped with mold halves is limited to a reasonable number) allows the mold core support to have a smaller volume and thus also a lower weight. This smaller size reduces machine cost since less space is required between the mold mounting plates for the pivoting movement, which enables a significant shortening in cycle times of the entire device.

An advantageous feature of the present invention is also provided when the mold core support is connected on its end surfaces facing the support blocks with pivots that precisely maintain its axis of rotation. Preferably, the pivots are connected to the mold core support in a way that ensures coordination of the mold core support with its axis of rotation free of play and minimizes of the weight of the rotational axis, so that trouble-free positioning of the mold core support between the mold mounting plates depends only on the configuration and adjustment of the bearings arranged in the support blocks.

A particularly advantageous embodiment of the present invention has the length of the pivots dimensioned so that they extend adequately into the bearings located in the support blocks to allow removal of the mold core support. In particular, at least one of the bearings in the support blocks can be opened in a direction toward one of the mold mounting plates to release or receive a pivot of the mold core support. This construction significantly simplifies replacement of heavy mold core supports where, for example, the bearing of the upper support block is opened and the support block is retracted briefly (and separately) in the direction toward one of the mold mounting plates by means of at least one drive device. The mold core support can then be lifted by conventional means including, for example, an overhead crane, withdrawn vertically from the bearing arranged in the lower support block, and removed from the machine. A new mold core support can then be inserted in the opposite sequence, after which by means of at least one drive device of the upper support block, the rotational axis can be aligned very precisely before all drive devices of the support blocks are activated synchronously during normal operation.

In another embodiment of the present invention, it is desirable for the pivots to end at the entry openings of the bearings, and be connected there in any suitable fashion, possibly through the use of additional pivots permanently secured in the bearings and partially protruding from the entry openings of the bearings by means of conventional coupling devices. This construction permits replacement of the mold core supports more simply, which would be particularly advantageous, for example, in the absence of an overhead crane. After alignment of the mold core support in a predetermined angular position and subsequent loosening of the associated safety bolts, the mold core support can be withdrawn laterally by means of an appropriate tool-change device of the known type, from the region of the support blocks (or inserted in the opposite sequence).

Another feature of the present invention that has proven advantageous, involves a construction in which at least one of the pivots is connected directly, or via a gear train, to a drive motor mounted on the associated support block. This arrangement (especially with heavy mold core supports) provides trouble-free pivoting between the desired positions on a minimal transfer path. The drive motor can be an electric motor or hydraulic motor of known type, which is controlled with particular advantage using an angle coder.

An advantageous embodiment of the present invention is also provided if the desired end positions of the pivoting movements of the mold core support are controlled and fixed around its vertically aligned rotational axis by means of one or more index elements. This involves controlling the operation of the drive motor by an independent monitoring element and ensuring that the (heavy) mold core support does not execute independent drift movements around its rotational axis when the drive motor is deactivated. The preferred construction includes a hydraulically operated retaining pin mounted on a support block to function as an index element, cooperating with a complementary hole in the end of the mold core support facing the associated support block. An alternative index element can be provided by a retaining pin that is attached to a support block and applies spring force to a roller ball on the outside of the mold core support facing the associated support block. The ball enters a detent when the mold core reaches the desired position, and is withdrawn from the detent by suitable means, such as an electromagnet, providing a conventional ball locking device.

In another modification of the present invention it has proven advantageous for the additional mold halves to be mounted replaceably on the mold core supports, especially when attachment of the additional mold halves onto the mold core supports occurs by means of quick-release closures. This configuration enables particularly high flexibility of the entire device to be achieved with respect to the variety of articles that can be produced.

In another very advantageous modification of the present invention, the drive devices for changing the corresponding relative spacing between the mold mounting plates and each support block are hydraulically operated piston-cylinder units. These hydraulic units are connected at one end to the moveable mold mounting plate and on the other end to one of the support blocks, to initiate movement of the blocks parallel to the longitudinal direction of the tie rods. Such drive devices are capable of positioning the associated elements with high precision. In the design disclosed herein, they assure that a simple relationship can always be maintained between the mold core support and the moveable mold mounting plate before they interact with the fixed mold mounting plate by means of the clamping unit. This is particularly advantageous when the injection molding machine according to the present invention is used temporarily (for operational reasons) as a simple one-component injection molding machine with a standard die, allowing the second mold half to be fixed for a series of injection molding cycles on a suitable side surface of the mold core support that is "locked" in this position. Correspondingly, the mold core support (if desired or necessary for operational reasons) can be temporarily used advantageously with the described arrangement as a center block of a conventional stage die to produce two identical or different injection molded articles from at least one plastic melt.

In another embodiment of the device according to the present invention, it is also viewed as advantageous that individual or all mold halves have at least one entry opening of a sprue channel for connection of an appropriately aligned and moveable plasticizing and injection unit on at least one of their side surfaces, extending between the support surface and parting plane. In this manner, the sprue channels can be significantly shortened between the nozzle output of each side mounted plasticizing and injection unit and the corresponding cavity of an injection mold, as compared to the aforementioned prior art. This can be achieved when the corresponding height of the concerned mold half permits such positioning of a nozzle of a plasticizing and injection unit. It has proven correspondingly advantageous, at least in special applications, for the mold core support to have at least one inlet opening of a sprue channel for connection to an appropriately aligned and moveable plasticizing and injection unit on at least one of its side surfaces aligned parallel to its axis of rotation. Each sprue channel serves to supply a predetermined plastic melt to at least one additional mold half that forms a complete injection mold with a mold half attached to one of the mold mounting plates in the closed state secured by the mold core support. This arrangement significantly increases the flexibility of the entire device both with reference to the space utilization possible in each individual case and the possibility of filling the mold cavity of an injection molding machine optionally simultaneously or directly in succession with more than one plastic melt.

DESCRIPTION OF THE PREFERRED EMBODIMENT

Figure 1:
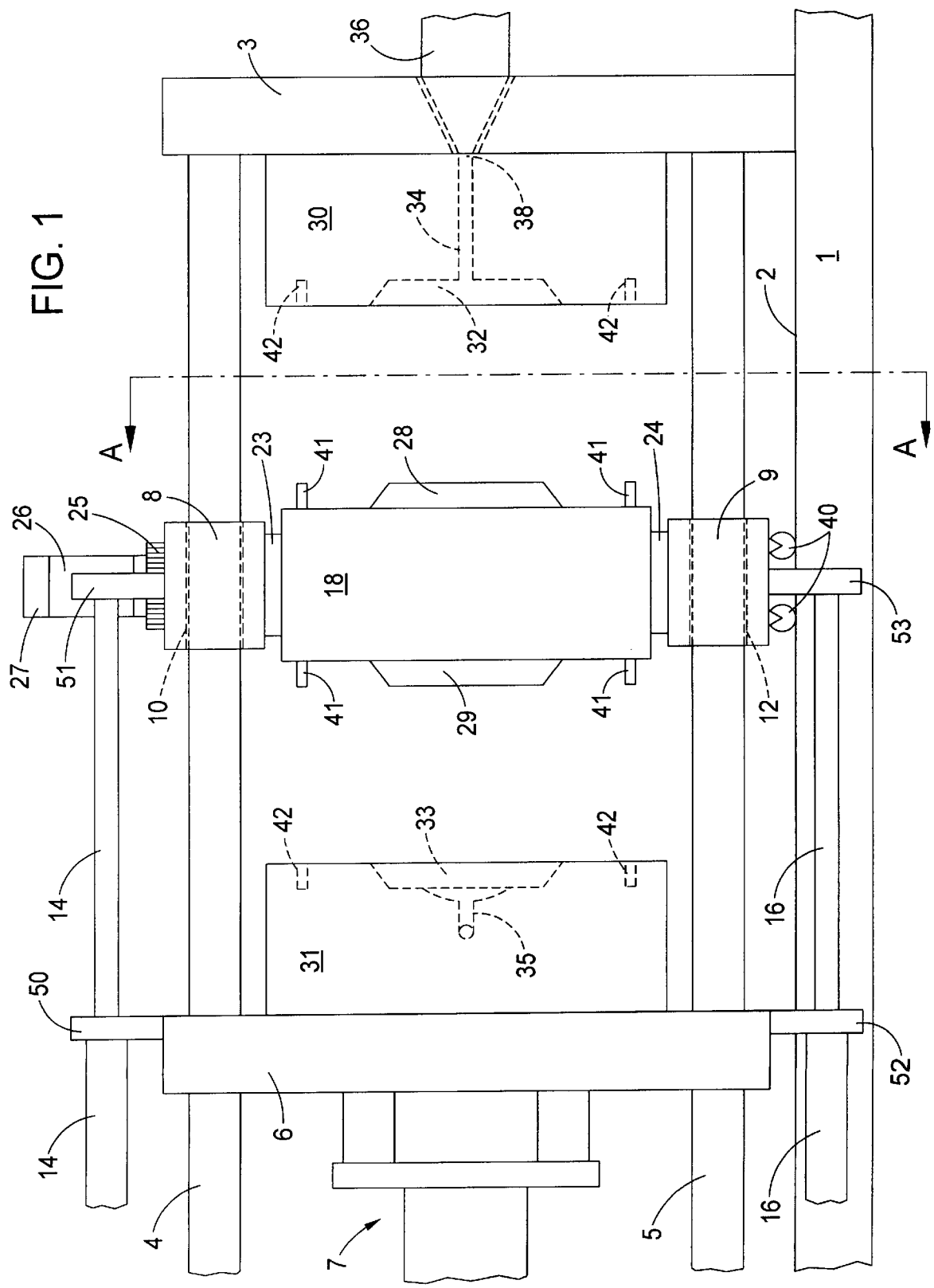
FIG. 1 shows a partial, fragmentary side view of an injection molding machine illustrating the essential characteristics for the present invention.

FIG. 1 shows a partial side view of an injection molding machine illustrating the essential elements of the present invention. In particular, as generally known in the art, a fixed (front) mold mounting plate 3 is mounted on a machine frame 1 that has an upper edge region in the form of machine bed 2. Connected to the fixed plate 3 are two pairs of tie rods 4, 5 aligned essentially horizontally (only one tie rod 4, 5 of each pair is visible in FIG. 1). The opposite ends of the pairs of tie rods 4, 5 connect to a counter-pressure (rear) plate (not shown since it is of a type generally known in the art), which is also mounted on the machine frame 1. A moveable mold mounting plate 6 is arranged on tie rods 4, 5 in known fashion and is moved on tie rods 4, 5 by means of a clamping unit 7 (not shown in detail since it is also of known type) which can be configured, for example, as a hydraulically operated piston-cylinder arrangement arranged between the counter-pressure plate and the moveable mold mounting plate 6. Alternatively clamping unit 7 could be a toggle mechanism driven by a hydraulic piston-cylinder arrangement or an electric motor combined with a rack and pinion arrangement, or another equivalent drive device.

On each pair of tie rods 4, 5 an essentially horizontally aligned stable support block 8, 9 is also arranged between the mold mounting plates 3, 6. The tie rods 4, 5 pass through bores 10, 11 in support block 8 and bores 12, 13 in support block 9 (only the bores 10, 12 are visible in FIG. 1, see FIG. 2). The support blocks 8, 9 can be moved on the tie rods 4, 5 relative to the mold mounting plates 3, 6 by means of drive devices 14, 15, 16, 17. Although four such devices are shown (see FIG. 2), is conceivable that sufficient driving force could also be provided by only one such device or by more than two such devices on each support block. The drive devices 14, 15, 16, 17 are illustrated as hydraulically operated piston-cylinder arrangements connected to both the moveable mold mounting plate 6 and to the corresponding support block 8, 9. This can be accomplished, for example, by fixed brackets 50, 51, 52, 53, 54, 55 of known type; however, only the fixed brackets 51, 53, 54, 55 mounted on support blocks 8,9 are visible in FIG. 2. The hydraulically operated piston-cylinder arrangements can be replaced by any other suitable means, such as, a spindle drive operated by electric motors, or a rack and pinion arrangement. Note also that although the drive devices 14, 15, 16, 17 are shown as fastened on the moveable mold mounting plate 6, they could also attach to the fixed mold mounting plate 3 or directly on the machine frame 1. With this type of machine construction, it is expedient to coordinate control the movement of an additional component of an injection molding machine with the control of the moveable mold mounting plate 6, so that the position of the plate 6 is referred to as the primary reference quantity for movement of the additional component.

Figure 2:
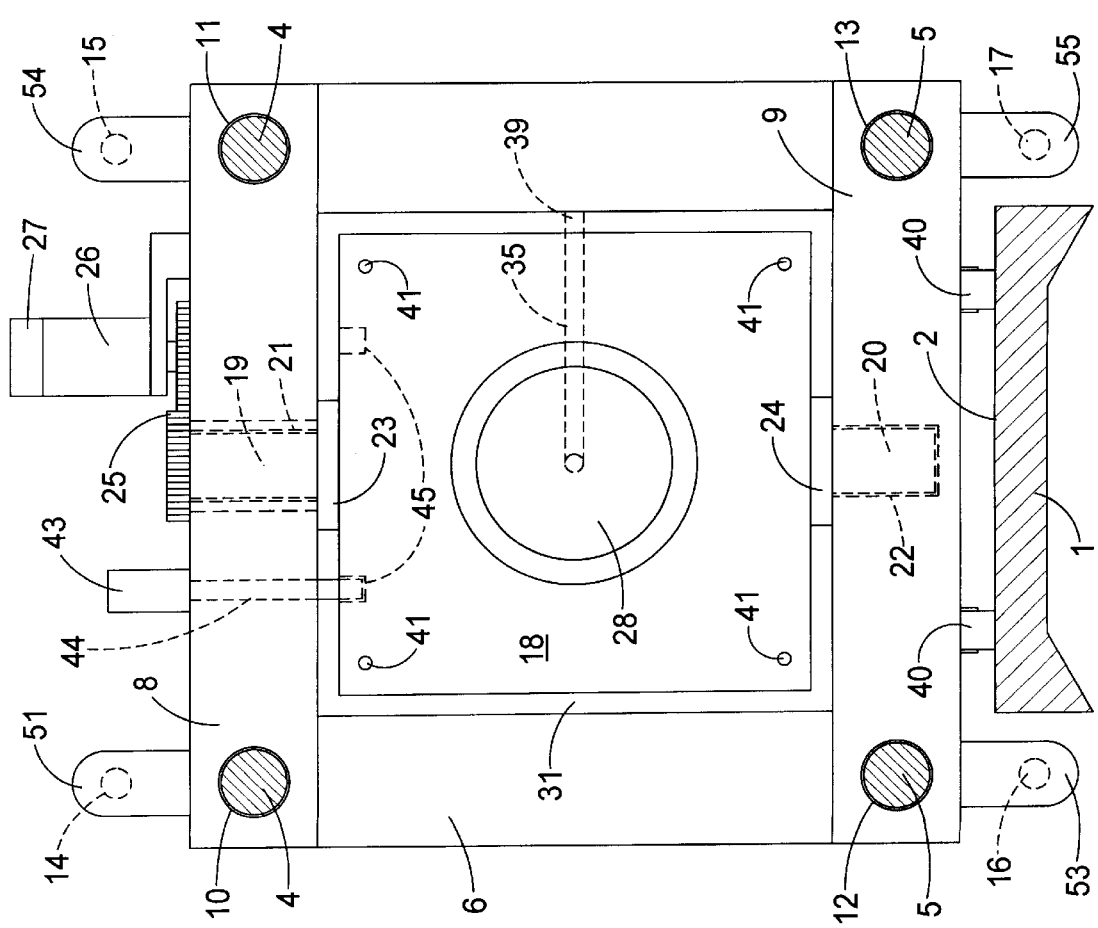
FIG. 2 shows a partial, fragmentary section view taken along the line A—A of FIG. 1.
Figure 2:
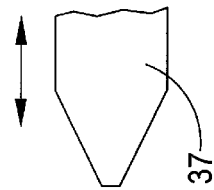

The support blocks 8, 9 keep in position a mold core support 18 that preferably has the form of a rectangular plate, but can be designed generally as any prismatic body with the desired number and configuration of its side surfaces parallel to its axis of rotation. This mold core support 18 is pivotable about an essentially vertically aligned axis of rotation near its geometric center. To facilitate this construction, pivots 19, 20 are attached to the plate-like mold core support 18 in alignment with its axis of rotation and are received by bearings 21, 22 contained within appropriately sized bores in support blocks 8, 9. During parallel positioning of the support blocks 8, 9 and mold core support 18, vertical alignment is maintained by means of the pivots 19, 20, as shown in FIG. 2. Alternatively, the pivots 19, 20 can be replaced by a continuous member extending between the support blocks 8, 9 and suitably connected to the mold core support 18. To facilitate pivoting movements of mold core support 18, a friction or pivot bearing 23, 24 of the known type is provided at the corresponding base region of pivots 19, 20. The bearings 23, 24 also support the adjacent surface of the mold core support 18 and establish a spacing from the directly opposite surface of the corresponding support block 8, 9. Moreover, the pivot 19 that engages in the bearing 21 of upper support block 8 is coupled by a gear train 25 to a drive motor 26 of the known type preferably mounted on the upper support block 8. Either an electric or hydraulic motor, for example, can be used to initiate the pivoting movements of the mold core support 18, using feedback from an angle coder 27 to control position.

It should be readily apparent that many of the aforementioned elements of the injection molding machine can also be replaced by equivalents known in the art; for example, the rectangular mold core support 18 can be replaced by an element having multiple surfaces suitable for the purpose. All that is required is a shape having a surface perpendicular to the axis of rotation; this could be in the form of a regular or irregular, even-numbered or odd-numbered polygon, configured so that one or more pairs of side surfaces are aligned parallel to each other and to the axis of rotation. In addition, although the drive motor 26 is shown on the upper support block 8, it can be replaced by one that is coupled directly to the pivots 19, 20 without interposition of a gear train 25, or by an equivalent (additional or alternative) arrangement with or without gear train 25 associated with the lower support block 9. The drive motor controlled by an angle coder can also be replaced by an electric servomotor, for example. The pivots 19, 20 (or a continuous axis used in their place) can also be configured so that a partial length of the pivots 19, 20 is permanently held in bearings 21, 22 and only protrudes from bearings 21, 22 with a specified portion of its length. Similar, shortened partial lengths of pivots 19, 20 would also be present on mold core support 18, which can be connected outside of the bearings 21, 22 with the mating length portion by conventional coupling methods.

The mold core support 18 carries on its two large surfaces additional mold halves 28, 29, which can also be designed as simple cores. After activation of clamping unit 7, the mold cavities 32, 33 are formed by closing the mold halves 30, 31 with mold core halves 28, 29, held together by the mold mounting plates 3, 6. The mold cavities 32, 33 receive the desired plastic melts from sprue channels 34, 35 that are supplied by conventional plasticizing and injection units 36, 37 (see FIGS. 1 and 2). It is possible, although not shown, for any or all of the injection mold cavities 32, 33 to be supplied by multiple sprue channels from one or more plasticizing and injection units, simultaneously or in immediate succession, with one or more plastic melts having different properties. For such applications, the sprue channels 34, 35 can then run through the moveable mold mounting plate 6 or the mold core support 18. While the "primary" plasticizing and injection unit 36 is ordinarily installed on the side of the fixed mold mounting plate 3 facing away from injection molds 32, 33 (as shown in FIG. 1), it is often desirable for other of the plasticizing and injection units to be located in the side region of the injection molding machine. These side units are movable during the molding cycle and are only positioned against the corresponding sprue openings 39 during the closed state of injection mold cavities 32, 33.

The present injection molding machine is intended to produce injection molded articles from at least two plastic melts that are not producible by simultaneous or directly sequential injection of several plastic melts into a single injection mold, such as that used to produce sandwich-like injection molded articles. For this purpose, after the injection mold cavities 32, 33 are formed (with the clamping unit 7 in the closed position), only a portion of the finished part is injected as predetermined by the mold cavity configuration. For example, when the clamping unit 7 closes, a quantity of a first plastic melt is delivered into the injection mold cavity 32 depicted on the right, by plasticizing and injection unit 36; simultaneously, the molded portion produced during the previous cycle in injection mold 32, is combined with a second plastic melt delivered by plasticizing and injection unit 37 to form a completed part in the injection mold cavity 33 depicted on the left. The mold mounting plates 3, 6 and the mold core support 18 are then moved to open the molds by means of clamping unit 7 and drive devices 14, 15, 16, 17; when the fully open position is achieved, the mold core support 18 is pivoted by means of drive motor 26 by an angle of 180° around its essentially vertical axis of rotation. The finished injection molded article is discharged from the injection mold 33 at an appropriate point during the pivoting, then the injection mold cavities 32, 33 are brought together again to repeat the injection processes.

When a mold core support 18 has a cross-sectional surface (perpendicular to its axis of rotation) different from that shown in the drawings, for example, a cross-sectional surface configured as a regular, even-numbered polygon, several injection molded articles can be produced from one or two plastic melts, or multiple injection molded articles can be produced from more than two plastic melts in smaller pivoting steps of, say, 90° or 60° around the rotational axis in one machine cycle. The plastic melts can then have different material properties, different colors or different properties of light transmission. However, in some instances, it may be desirable for the melt supplies to be completely identical if the injection molded articles to be produced require a stepwise manufacturing process from the same material to improve the quality of the molded article.

When the mold core support 18 is particularly heavy, it is preferable to provide additional support for the lower support block 9 by means of rollers and/or rails 40 that travel on the machine bed 2. In addition, the mold core support 18 can be provided with alignment pins 41, which interact with corresponding holes 42 in the mold halves 30, 31 when brought into contact by the mold mounting plates 3, 6. Obviously, the arrangement of the pins 41 and holes 42 can be reversed, if desired.

FIG. 2 adds to the detail shown in FIG. 1 by illustrating the paired arrangement of tie rods 4, 5; the complete arrangement of drive devices 14, 15, 16, 17; the relationship of the sprue channel 35 with sprue opening 39 in mold half 31 and the relative position of plasticizing and injection unit 37; and the pivots 19, 20 in bearings 21, 22. Note that the broken lines adjacent bearing 21 in the upper support block 8 are intended to show that a section of support block 8 and the bearing 21 can be opened (or removed) in a direction toward one of the mold mounting plates 3, 6, in order to release the pivot 19 and thus allow the entire mold core support 18 to be removed by means of an overhead crane or other means, as known in the art.

In addition, FIG. 2 shows the coupling of the drive motor 26 and the pivot 19 through gear train 25. Note also the depiction of an index element 43, which provides a means of locking the end position of the pivoting movements of the mold core support 18, thereby preventing drifting movements of the support plate 18 when drive motor 26 is deactivated. In the preferred embodiment, index element 43 includes a retaining pin 44 moveable linearly by appropriate means, such as a hydraulically operated piston-cylinder arrangement, fixed on the upper support block 8. The locking action of pin 44 cooperates with corresponding retaining holes 45 in the outside surface of support plate 18 directly opposite support block 8. Naturally, index element 43 can also be replaced by any other equivalent means, for example, by an electro-magnetic ball-locking device in which a retaining pin is attached to a support block and applies spring force to a roller ball on the outside surface of the mold core support facing the associated support block. The ball enters a detent when the mold core reaches a desired position, and is withdrawn from the detent by suitable means, such as an electromagnet, to allow the mold core support to pivot to the next position.

The depicted arrangement of tie rods 4, 5 is also not essential, but can be replaced by a construction in which the upper support block 8 or the lower support block 9 or both are carried and supported by more than two tie rods.

The patent protection sought for the present invention is not intended to be restricted to the practical example shown, but concerns all possible embodiments for a device to produce injection molded articles from at least two plastic melts, as embraced by the features and combination of elements set forth in the following claims.

What is claimed is:

1. Apparatus for production of injection molded articles from at least two plastic melts, including a fixed mold mounting plate installed on a machine frame and a movable mold mounting plate carried by at least four essentially horizontal tie rods connected to the fixed mold mounting plate, an additional mold mounting device movable relative to the mold mounting plates and pivoted around an axis of rotation aligned perpendicular to the longitudinal axis of the tie rods, the additional mold mounting device carrying additional mold halves on at least two side surfaces aligned with a spacing from each other and parallel to the axis of rotation configured to cooperate with mold halves mounted on the mold mounting plates, wherein each of the mold mounting plates is provided with at least one opening that permits connection of a plasticizing and injection unit to the sprue channels in the mold halves mounted on the mold mounting plates, characterized in that the additional mold mounting device (8, 9, 18) comprises upper and lower support blocks (8, 9) spaced apart and relatively arranged in an essentially vertical plane with each support block being guided and carried by at least two tie rods (4, 5) arranged in an essentially horizontal plane, the support blocks each being provided with a bearing (21, 22) to receive essentially vertically aligned pivots (19, 20) of a prismatic mold core support (18), the mold core support (18) providing mounting surfaces for additional mold halves (28, 29), the additional mold mounting device further comprising at least two drive devices (14, 15, 16, 17), for changing the relative spacing between the mold mounting plates (3, 6) and the support blocks (8, 9) in the longitudinal direction of tie rods (4, 5), wherein the bearings (21, 22) and the pivots (19, 20) are constructed so that the mold core support (18) can be removed from the support blocks (8, 9) without removing the support blocks (8, 9) from the tie rods (4, 5).

2. Apparatus according to claim 1, wherein the lower support block (9) is adjacent to the machine frame and is supported by means of rollers (40) on a machine bed (2) that forms an upper surface of the machine frame (1) running beneath the tie rods (4, 5).

3. Apparatus according to claim 1, wherein a cross-section of the mold core support (18) perpendicular to its rotational axis (19, 20) is in the form of a regular, even-numbered polygon, in which each side surface arranged parallel to the rotational axis (19, 20) can be used as a support surface for at least one additional mold half (28, 29).

4. Apparatus according to claim 1, wherein a cross-section of the mold core support (18) perpendicular to its rotational axis (19, 20) is in the form of an irregular, even-numbered polygon, in which only certain pairs of side surfaces arranged parallel to each other and relative to the rotational axis can be used as support surfaces for at least one additional mold half (28, 29).

5. Apparatus according to claim 4, wherein a cross-section of the mold core support (18) perpendicular to its rotational axis (19, 20) is in the form of an elongated rectangle, in which only the side surfaces arranged parallel to the rotational axis (19, 20) and forming the long edges of the rectangle are used as support surfaces for at least one additional mold half (28, 29).

6. Apparatus according to claim 1, wherein the mold core support (18) is connected on its outside surfaces facing the support blocks (8, 9) with pivots (19, 20) that maintain the rotational axis of the mold core support.

7. Apparatus according to claim 6, wherein the length of the pivots (19, 20) is dimensioned to extend into the bearings (21, 22) arranged in support blocks (8, 9) and at least one of the bearings (21, 22) along with the adjacent section of the associated support block (8, 9) can be opened in a direction toward one of the mold mounting plates (3, 6) and closed again after releasing or receiving the corresponding pivot (19, 20).

8. Apparatus according to claim 6, wherein the length of each of the pivots (19, 20) is divided into two portions, such that first portions attached to the mold core support (18) are connectable by means of a coupling to mating second portions that partially protrude from each of the bearings (21, 22).

9. Apparatus according to one of claims 6, 7 or 8, wherein at least one of the pivots (19, 20) is connected to a drive motor (26) mounted on the adjacent support block (8, 9).

10. Apparatus according to claim 9, wherein the drive motor (26) is an electric motor.

11. Apparatus according to claim 9, wherein the drive motor (26) is a hydraulic motor.

12. Apparatus according to claim 9, wherein the drive motor (26) is controlled via an angle coder (27).

13. Apparatus according to claim 1, wherein the additional mold halves (28, 29) are fastened replaceably on the mold core support (18).

14. Apparatus according to claim 1, wherein the drive devices (14, 15, 16, 17) that change the relative spacing between the mold mounting plates (3, 6) and the support blocks (8, 9) are hydraulically operated piston-cylinder units, connected at one end to the moveable mold mounting plate (6) and at the other end to one of the support blocks (8, 9) and movable parallel to the longitudinal direction of tie rods (4, 5).

15. Apparatus according to claim 1, wherein at least one of the mold halves (31) has at least one entry opening (39) of a sprue channel (35) for connection of an appropriately aligned and moveable plasticizing and injection unit (36) on at least one side surfaces extending between the associated support surface and a parting plane.

16. Apparatus according to claim 1, wherein the mold core support (18) has on at least one of its side surfaces aligned parallel to its rotational axis (19, 20) one inlet opening of a sprue channel for connection of an appropriately aligned and moveable plasticizing and injection unit (37), whereby each sprue channel serves to supply a predetermined plastic melt to at least one additional mold half held by the mold core support (18) when a complete injection mold in the closed state is formed with one of the mold halves (30, 31) attached on one of the mold mounting plates (3, 6).

17. Apparatus for production of injections molded articles from at least two plastic melts, including a fixed mold mounting plate installed on a machine frame and a movable mold mounting plate carried by at least four essentially horizontal tie rods connected to the fixed mold mounting plate, an additional mold mounting device movable relative to the mold mounting plates and pivoted around an axis of rotation aligned perpendicular to the longitudinal axis of the tie rods, the additional mold mounting device carrying additional mold halves on at least two side surfaces aligned with a spacing from each other and parallel to the axis of rotation configured to cooperate with mold halves mounted on the mold mounting plates, wherein each of the mold mounting plates is provided with at least one opening that permits connection of a plasticizing and injections unit to the sprue channels in the mold halves mounted on the mold mounting plates, characterized in that the additional mold mounting device (8, 9, 18) comprises upper and lower support blocks (8, 9) spaced apart and relatively arranged in an essentially vertical plane with each support block being guided and carried by at least two tie rods (4, 5) arranged in an essentially horizontal plane, the support blocks each being provided with a bearing (21, 22) to receive essentially vertically aligned pivots (19, 20) of a prismatic mold core support (18), the mold core support (18) providing mounting surfaces for additional mold halves (28, 29), the additional mold mounting device further comprising at least two drive devices (14, 15, 16, 17), for changing the relative spacing between the mold mounting plates (3, 6) and the support blocks (8, 9) in the longitudinal direction of tie rods (4, 5), wherein the desired stop positions of the pivoting movements of mold core support (18) around its essentially vertically aligned rotational axis (19, 20) are controlled and fixed by at least one index element (43) attached to one of the support blocks (8, 9) to engage selectively the mold core support (18).

18. Apparatus according to claim 17, wherein the index element (43) is a hydraulically operated retaining pin (44) attached to one of the support blocks (8, 9) and positioned to cooperate with a suitable hole (45) in the outside of mold core support (18) facing the support block (8, 9) that holds the index element.

19. Apparatus according to claim 17, wherein the index element (43) is a retaining pin attached to one of the support block (8, 9) and positioned to apply spring force to a roller ball in contact with a surface of the mold core support (18) facing the support block (8, 9) that holds the index element, such that upon reaching a desired stop position, the roller ball will enter an opening in the surface of the mold core support and can be withdrawn from this opening by means of an electromagnet when the mold core support is repositioned.

* * * * *